United States Patent
Lei et al.

(10) Patent No.: US 11,606,807 B2
(45) Date of Patent: Mar. 14, 2023

(54) TECHNIQUES FOR CONFIGURING AND INDICATING RADIO RESOURCE CONTROL (RRC) MESSAGES IN WIRELESS COMMUNICATIONS

(71) Applicant: QUALCOMM Incorporated, San Diego, CA (US)

(72) Inventors: Jing Lei, San Diego, CA (US); Hwan Joon Kwon, San Diego, CA (US); Linhai He, San Diego, CA (US); Huilin Xu, San Diego, CA (US); Peter Pui Lok Ang, San Diego, CA (US); Wanshi Chen, San Diego, CA (US); Xipeng Zhu, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/178,602

(22) Filed: Feb. 18, 2021

(65) Prior Publication Data
US 2021/0289534 A1    Sep. 16, 2021

Related U.S. Application Data

(60) Provisional application No. 62/988,355, filed on Mar. 11, 2020.

(51) Int. Cl.
*H04W 72/12* (2009.01)
*H04L 5/00* (2006.01)
*H04W 76/10* (2018.01)

(52) U.S. Cl.
CPC ....... *H04W 72/1289* (2013.01); *H04L 5/0053* (2013.01)

(58) Field of Classification Search
CPC ............ H04W 72/1289; H04W 76/10; H04W 72/0406; H04W 72/042; H04L 5/0053; H04L 5/0094; H04L 5/0051
See application file for complete search history.

(56) References Cited

U.S. PATENT DOCUMENTS

| 2014/0341143 | A1* | 11/2014 | Yang | ........................ H04L 5/001 370/329 |
| 2019/0182741 | A1* | 6/2019 | Oyman | ............... H04L 65/1069 |

(Continued)

FOREIGN PATENT DOCUMENTS

| CN | 112399626 | * | 8/2019 | .......... H04W 74/004 |
| JP | WO 2010047166 | * | 4/2010 | ............. H04L 5/003 |

(Continued)

OTHER PUBLICATIONS

Ericsson: "Signaling of Q for NR-U", 3GPP Draft, 3GPP TSG-RAN WG2 #109-e, R2-2000338, 3rd Generation Partnership Project (3GPP), Mobile Competence Centre, 650, Route Des Lucioles, F-06921 Sophia-Antipolis Cedex, France, vol. RAN WG2, No. Electronic Meeting, Feb. 24-Mar. 6, 2020, Feb. 13, 2020 (Feb. 13, 2020), XP051848540, 11 Pages, Retrieved from the Internet: URL: https://ftp.3gpp.org/tsg_ran/WG2_RL2/TSGR2_109_e/Docs/R2-2000338.zip R2-2000338—Signaling of Q in NR-U.docx, [Retrieved on Feb. 13, 2020], The Whole Document.

(Continued)

*Primary Examiner* — Diane L Lo
*Assistant Examiner* — Abusayeed M Haque
(74) *Attorney, Agent, or Firm* — ArentFox Schiff LLP

(57) ABSTRACT

Aspects described herein relate to configuring and indicating radio resource control (RRC) message types in wireless communications, to support new UE categories, new operation modes, new use cases, or a combination thereof. Configuration and indication methods that may support co-existence of new and legacy RRC message types and/or user (Continued)

equipment (UE) procedures for decoding new RRC message type are also described.

30 Claims, 7 Drawing Sheets

(56) References Cited

U.S. PATENT DOCUMENTS

| | | | | |
|---|---|---|---|---|
| 2019/0199427 A1* | 6/2019 | Zakaria | .............. | H04B 7/18513 |
| 2019/0313383 A1* | 10/2019 | Xiong | ................. | H04W 72/042 |
| 2019/0342801 A1* | 11/2019 | Cui | ....................... | H04W 24/10 |
| 2019/0386769 A1 | 12/2019 | Liu et al. | | |
| 2020/0137761 A1* | 4/2020 | Shih | ................. | H04W 72/0493 |
| 2020/0187245 A1* | 6/2020 | Fujishiro | ........... | H04W 72/0413 |
| 2022/0039009 A1* | 2/2022 | Iyer | .................... | H04W 72/044 |

FOREIGN PATENT DOCUMENTS

| | | | | | |
|---|---|---|---|---|---|
| JP | WO-2010047166 | * | 4/2020 | ............ | H04L 5/003 |
| WO | 2016064458 A1 | | 4/2016 | | |

OTHER PUBLICATIONS

International Search Report and Written Opinion—PCT/US2021/018781—ISA/EPO—Jan. 17, 2022.

* cited by examiner

TECHNIQUES FOR CONFIGURING AND INDICATING RADIO RESOURCE CONTROL (RRC) MESSAGES IN WIRELESS COMMUNICATIONS

CLAIM OF PRIORITY UNDER 35 U.S.C. § 119

The present application for patent claims priority to Provisional Patent Application No. 62/988,355, entitled "TECHNIQUES FOR CONFIGURING AND INDICATING RADIO RESOURCE CONTROL (RRC) MESSAGES IN WIRELESS COMMUNICATIONS" filed Mar. 11, 2020, which is assigned to the assignee hereof and hereby expressly incorporated by reference herein for all purposes.

BACKGROUND

Aspects of the present disclosure relate generally to wireless communication systems, and more particularly, to radio resource control (RRC) messages.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, radio resource control (RRC) messages can be communicated to carry signaling information from upper layers (e.g., layers above physical and media access control layers), which can include broadcast messages, paging messages, common control messages, system information messages, etc. RRC message configuration and indication in 5G NR and other wireless communication technologies is fixed to a number of specific message types and configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving, from a base station, a radio resource control (RRC) message, and where resources for receiving the RRC message are resources for a new RRC message type that is different from legacy RRC message types or where a message type indication of the RRC message indicates that the RRC message is of the new RRC message type, decode the RRC message based on the new RRC message type.

In another example, a method for wireless communication is provided. The method includes generating a RRC message that is of a new RRC message type that is different from legacy RRC message types, wherein generating the RRC message includes at least one of scheduling resources for transmitting the RRC message to indicate that the RRC message is of the new RRC message type or including a message type indication of the RRC message to indicate that the RRC message is of the new RRC message type, and transmitting, to one or more user equipment (UEs), the RRC message.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided including a transceiver, a memory configured to store instructions, and one or more processors communicatively coupled with the memory and the transceiver. The one or more processors are configured to receive, from a base station, a RRC message, and where resources for receiving the RRC message are resources for a new RRC message type that is different from legacy RRC message types or where a message type indication of the RRC message indicates that the RRC message is of the new RRC message type, decode the RRC message based on the new RRC message type.

In another example, an apparatus for wireless communication is provided including a transceiver, a memory configured to store instructions, and one or more processors communicatively coupled with the memory and the transceiver. The one or more processors are configured to generate a RRC message that is of a new RRC message type that is different from legacy RRC message types, wherein generating the RRC message includes at least one of scheduling resources for transmitting the RRC message to indicate that the RRC message is of the new RRC message type or including a message type indication of the RRC message to indicate that the RRC message is of the new RRC message type, and transmit, to one or more user equipment (UEs), the RRC message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
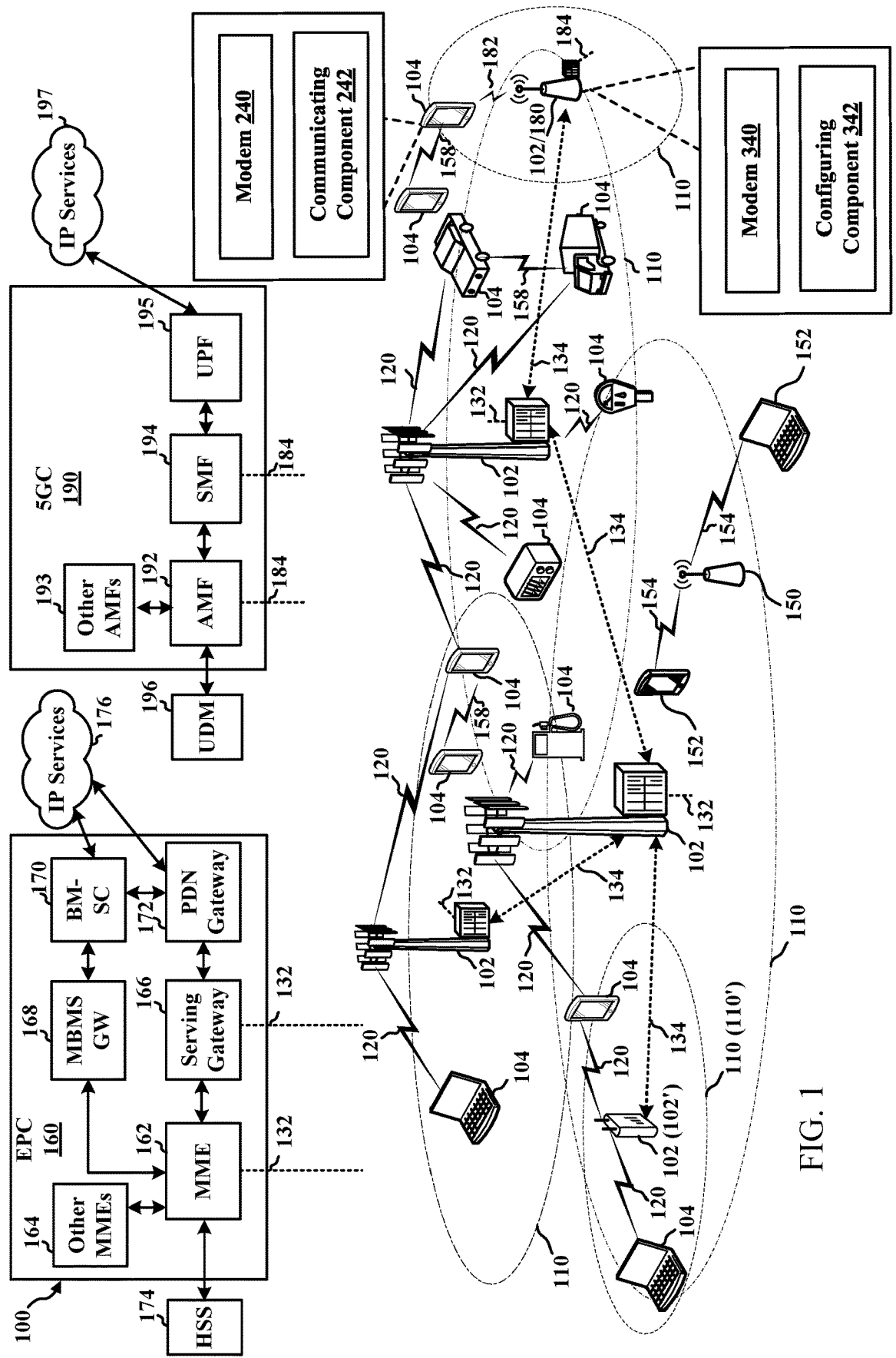
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring and indicating new radio resource control (RRC) message types for devices in a wireless communication technology without disrupting configuration of legacy devices in the wireless communication technology. For example, in fifth generation (5G) new radio (NR), new RRC message types can be introduced to support new user equipment (UE) categories, new operation modes, new use cases, etc. The new RRC message types can include broadcasting/multicasting messages (e.g., master information block (MIB), system information block (SIB), group paging, etc.) and dedicated RRC signaling. These message types can be configured and indicated without disrupting the operation of legacy UE categories, legacy operation modes, or legacy use cases using the mechanisms described herein.

In 5G NR, for example, there is a message type extension mechanism in the RRC message structure that includes a bit to indicate whether the RRC message is of an extended type, and UEs can differentiate between a legacy message type by checking the indication bit of the RRC message type. This can apply for broadcast control channel (BCCH), paging control channel (PCCH), and common control channel (CCCH) in 5G NR. In addition, in 5G NR, at least for PCCH and BCCH, if an encoded RRC message does not fill a transport block, the RRC layer can add padding bits to the encoded RRC message to fill the transport block, where the contents of the padding bits are set to zero (0), and/or where the number of padding bits is a multiple of eight. In addition, in general in 5G NR, a UE can consider a value in an RRC message as not comprehended when it is set to 1) an extended value that is not defined in the version of the transfer syntax supported by the UE; or 2) a spare or reserved value unless the specification defines specific behaviour that the UE is to apply upon receiving the concerned spare/reserved value. Similarly, in general in 5G NR, a UE can consider a field as not comprehended when it is defined as spare or reserved unless the specification defines specific behaviour that the UE is to apply upon receiving the concerned spare/reserved field.

In this regard, in an example, the indication bit for the message type can be used to indicate an RRC message of a new RRC message format, in which case legacy UEs can ignore the RRC message based on the indication of the message type. In another example, the new RRC message type can be indicated using the padding bits for RRC messages, which can be set to values other than zero and thus not comprehended by legacy UEs. In another example, other spare or reserved bits in the RRC message payload can be set to values to indicate the new RRC message type, which are not comprehended by legacy UEs. In other examples, the cyclic redundancy check (CRC) of the RRC message can be set to indicate the new RRC message type. In another example, configured parameters for scheduling or indicating the RRC message can be set to indicate the new RRC message type, such as a control resource set (CORESET), search space (SS) set, radio network temporary identifier (RNTI), etc. that are not used for legacy RRC messages or may be specific to the new RRC message type. In another example, resources for the new RRC message type can be allocated in time, frequency, space, and/or code domains that are not used for legacy RRC messages or may be specific to the new RRC message type. In any case, the new RRC message type can be configured and/or indicated without disrupting legacy RRC message communications.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably.

A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for configuring, determining an indication of, and/or decoding new RRC message types, in accordance with aspects described herein, and some nodes may have a modem 340 and configuring component 342 for indicating or configuring new RRC message types, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can determine RRC messages of a new RRC message type using various mechanisms described herein. For example, communicating component 242 can determine that an RRC message is of a new RRC message type based on resources over which the new RRC message is received or based on an explicit or implicit message type indication in the RRC message, etc. For example, the new RRC message may use parameters defined for legacy RRC messages to indicate the new RRC message type, such as an indicator bit for message type, padding bits, spare or reserved fields, etc. In another example, the new RRC message may indicate a CRC, CORESET, SS set, RNTI, etc., that can imply the new RRC message type. In any case, communicating component 242 can accordingly determine the new RRC message type and can accordingly decode the RRC message. In an example, the RRC message can be generated by a configuring component 342 and transmitted to the UE 104 by a corresponding base station 102. Thus, for example, configuring component 342 can generate the RRC message such to indicate the new RRC message type, as described above and further herein.

Figure 2:
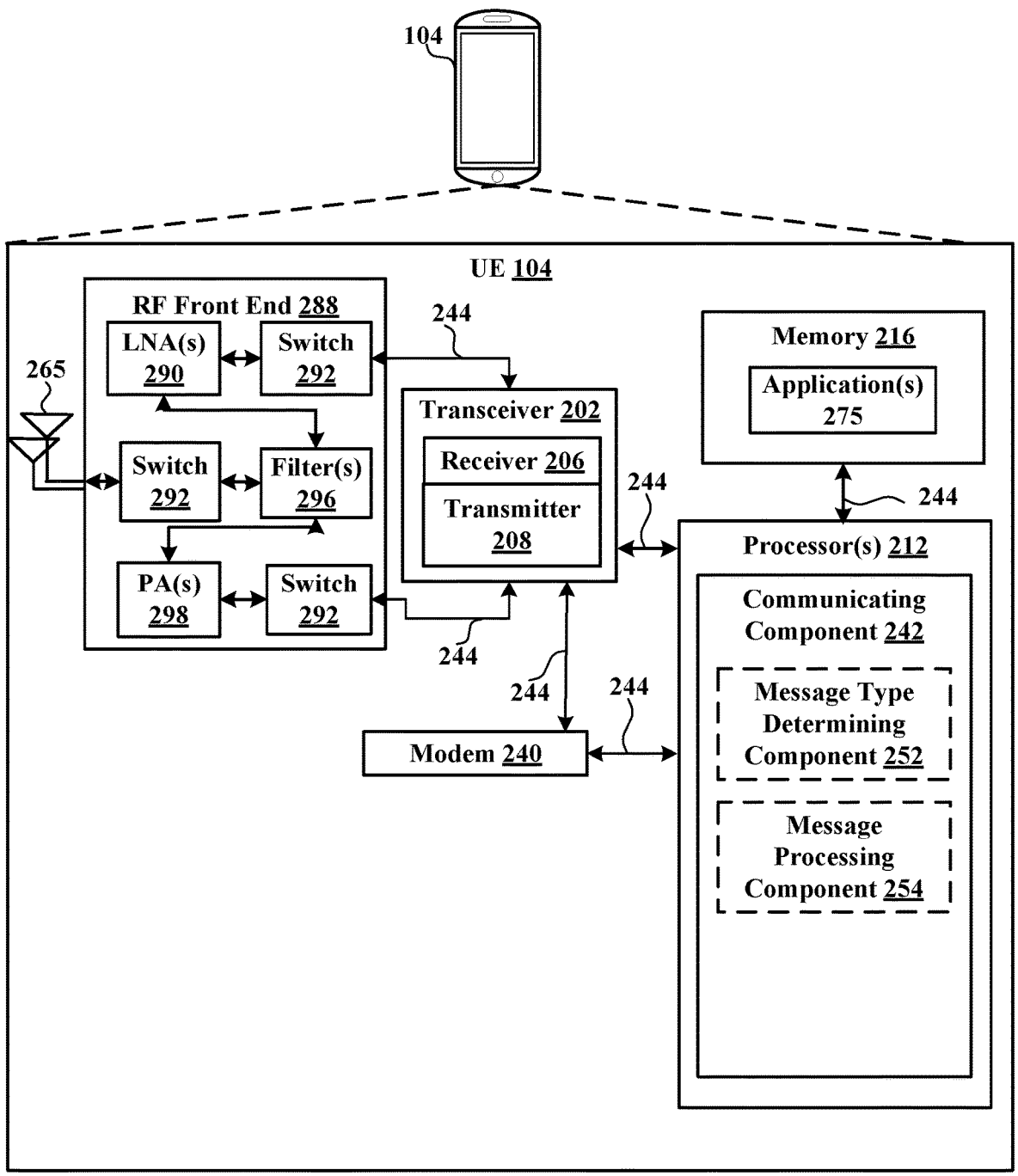
FIG. 2 is a block diagram illustrating an example of a UE, in accordance with various aspects of the present disclosure.
Figure 3:
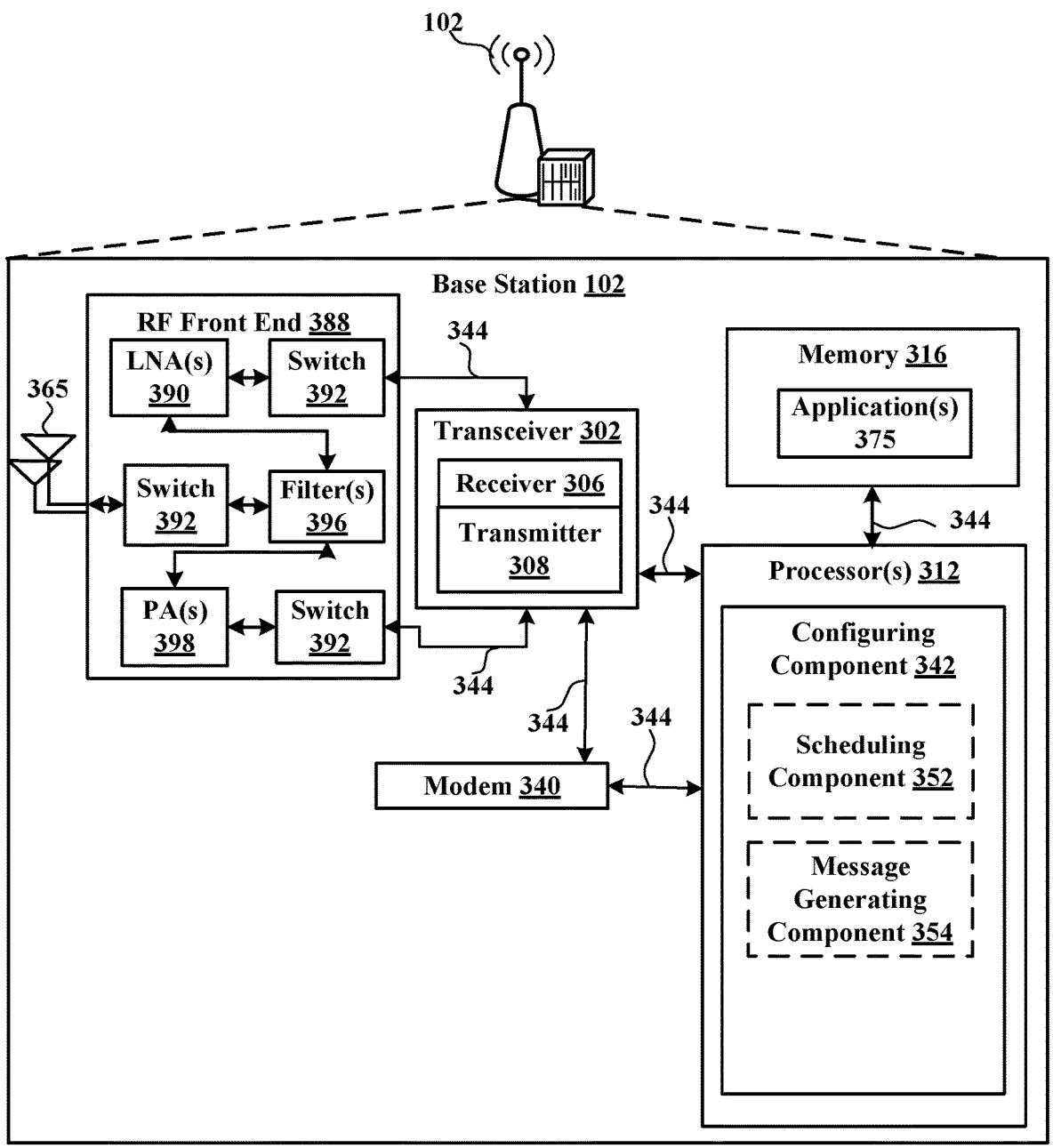
FIG. 3 is a block diagram illustrating an example of a base station, in accordance with various aspects of the present disclosure.
Figure 4:
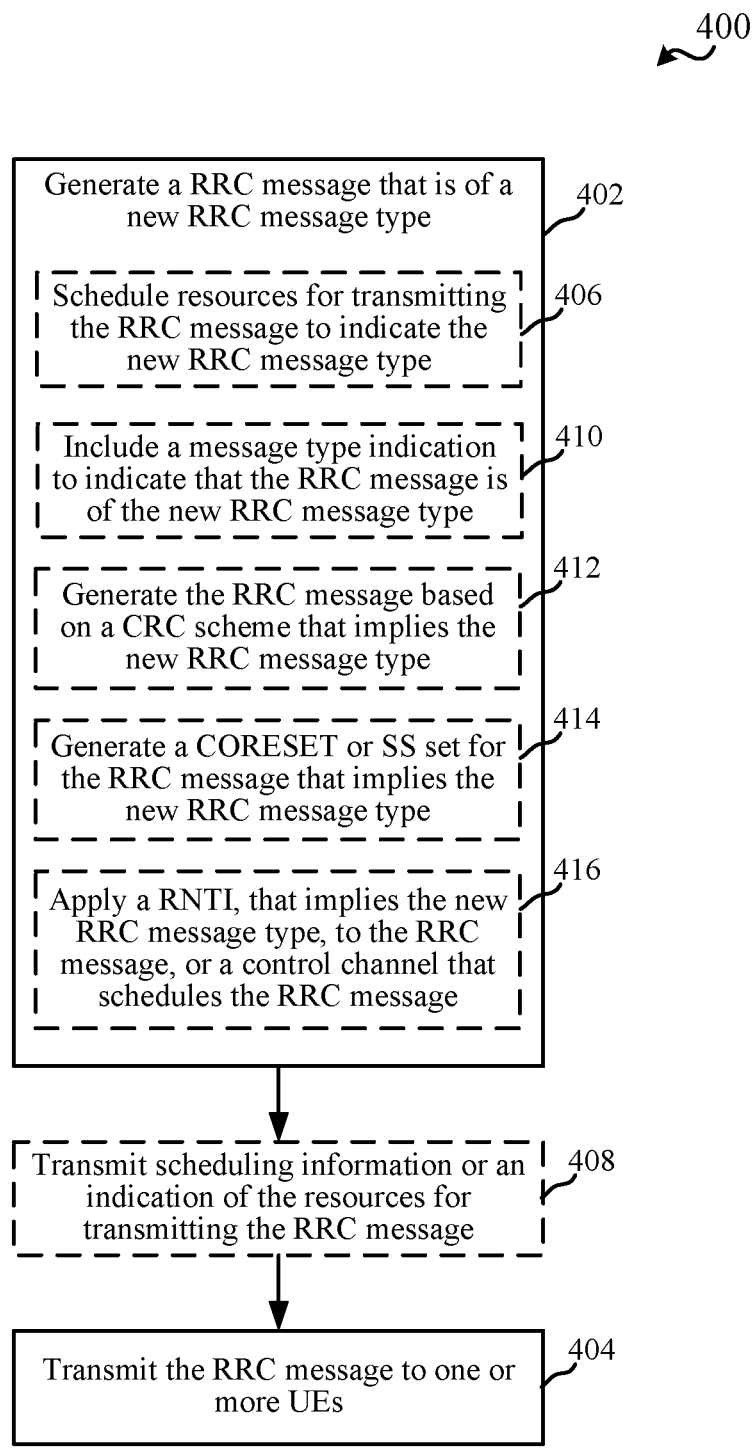
FIG. 4 is a flow chart illustrating an example of a method for detecting and processing radio resource control (RRC) messages of a new RRC message type, in accordance with various aspects of the present disclosure.
Figure 5:
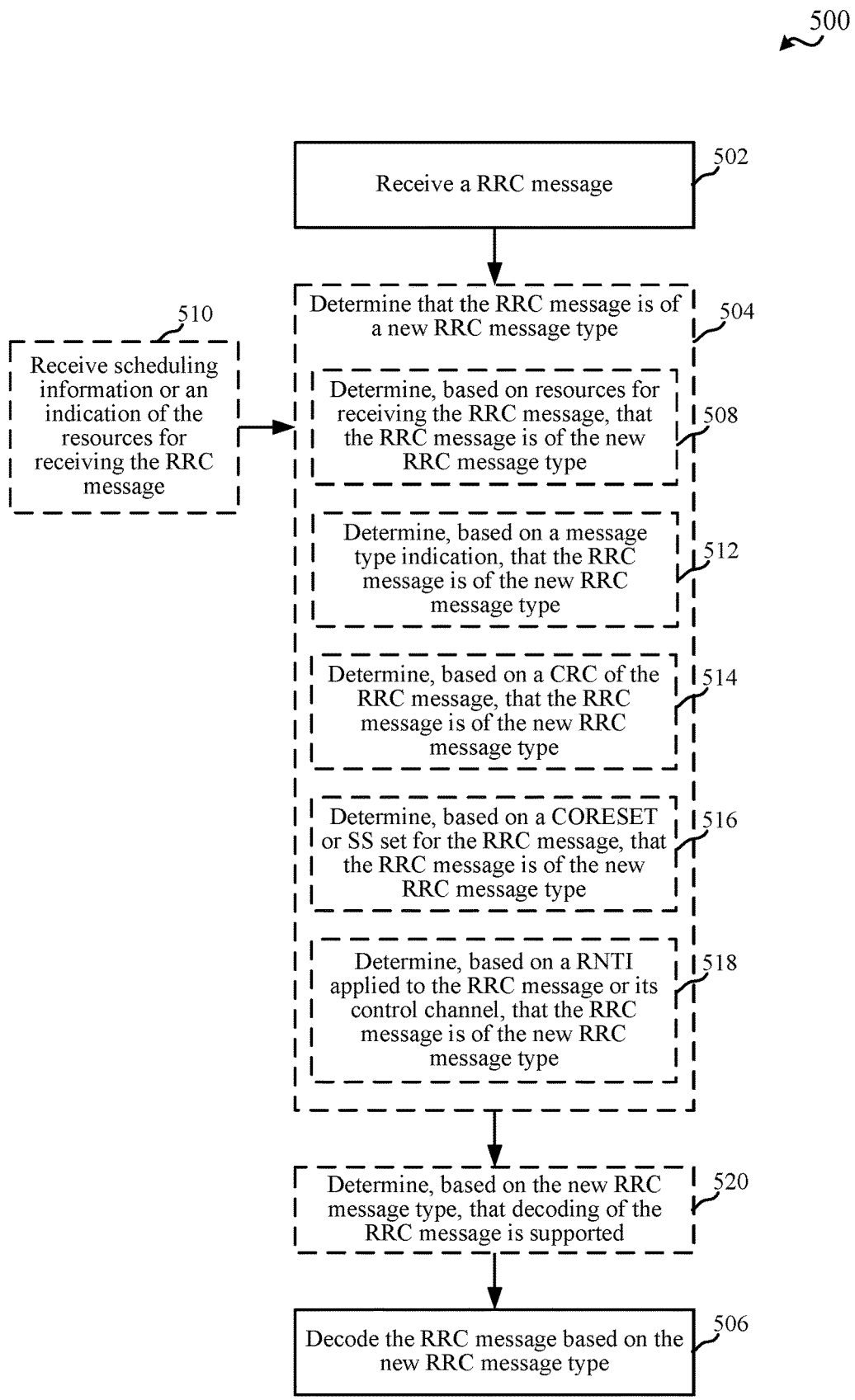
FIG. 5 is a flow chart illustrating an example of a method for configuring and indicating RRC messages of a new RRC message type, in accordance with various aspects of the present disclosure.
Figure 6:
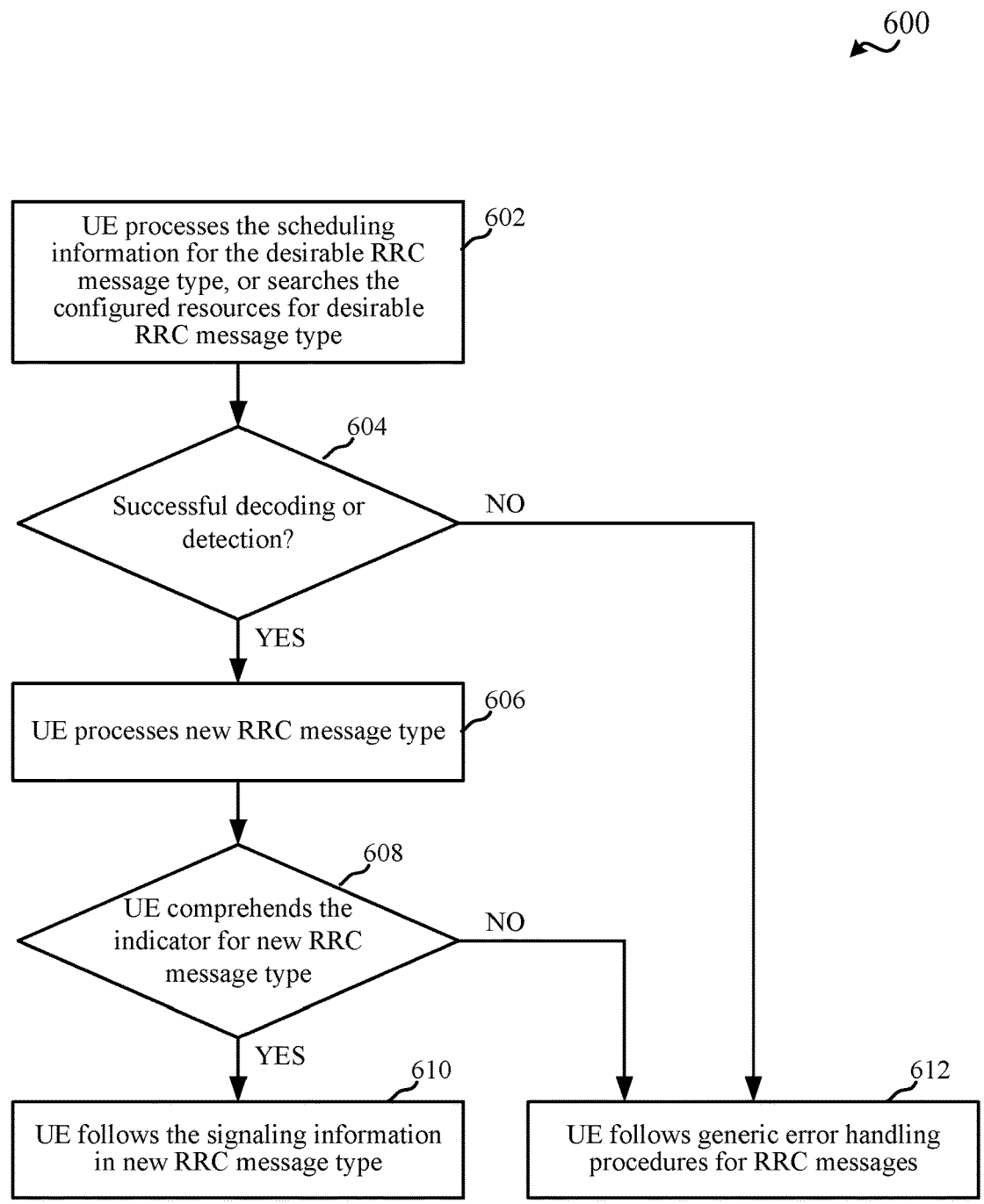
FIG. 6 is a flow chart illustrating an example of a method for processing RRC messages of a new RRC message type, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for configuring, determining an indication of, and/or decoding new RRC message types, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a message type determining component 252 for determining a RRC message type of a received RRC message, and/or a message processing component 254 for processing the RRC message based on the RRC message type, as described further herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for indicating or configuring new RRC message types, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a scheduling component 352 for scheduling resources for transmitting a RRC message, and/or a message generating component 354 for generating a RRC message that can be of a new (or legacy) RRC message type, as described further herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring and/or indicating RRC messages of a new RRC message type. FIG. 5 illustrates a flow chart of an example of a method 500 for receiving and decoding RRC messages of a new RRC message type. In an example, a base station can perform the functions described in method 400 using one or more of the components described in FIGS. 1 and 3, and/or a UE can perform the functions described in method 500 using one or more of the components described in FIGS. 1 and 2. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, a RRC message that is of a new RRC message type can be generated. In an aspect, message generating component 354, e.g., in conjunction with processor(s) 312, memory 316, transceiver 302, configuring component 342, etc., can generate the RRC message that is of the new RRC message type. For example, message generating component 354 can generate the RRC message based on one or more aspects of the UE 104 for which the message is being generated, a use case, an operation mode, etc. In an example, message generating component 354 can generate the RRC message for new UE categories, which may include NR-light devices or other categories that may be implemented. In this example, an NR-light device may have one or more different RRC messages with different RRC parameters than for other (e.g., legacy) devices.

In another example, message generating component 354 can generate the RRC message for new use cases, such as non-orthogonal multiple access (NOMA), coverage enhancement (e.g., for transmitting multiple instances of the RRC message), sidelink-based communication enhancement (e.g., for new RRC messages corresponding to sidelink communications between devices), small data transfer from RRC idle/inactive state, etc. In yet another example, message generating component 354 can generate the RRC message for new operation modes for devices or other network components, such as for half-duplex frequency division duplexing (HD-FDD) for NR light, dynamic spectrum sharing (DSS) for NR light, enhanced UE paging (e.g., sending multiple RRC paging messages), enhanced multi-transmission/reception point (TRP), enhanced connected mode discontinuous receive (C-DRX), etc. The new RRC messages, for example, can be RRC messages that are newly defined over other RRC messages in the wireless communication technology (e.g., 5G NR) to allow for expanding or enhancing functionality or related parameters communicated using the RRC messages. The other RRC messages defined in the wireless communication technology can be messages defined in a release or technical specification (TS) of the wireless communication technology, which can also be referred to or can include legacy RRC messages, legacy RRC parameters, etc.

In method 400, at Block 404, the RRC message can be transmitted to one or more UEs. In an aspect, configuring component 342, e.g., in conjunction with processor(s) 312, memory 316, transceiver 302, etc., can transmit the RRC message to one or more UEs. For example, configuring component 342 can transmit the RRC message over resources (e.g., time, frequency, space, code, etc. resources) defined for transmitting RRC messages. In an example, configuring component 342 can transmit the RRC message in a search space defined for RRC messages, based on a CORESET defined for RRC messages, etc. Moreover, as described herein, the resources can be defined for any RRC messages in the wireless communication technology, or can be defined specifically for the new RRC messages (and/or defined based on a specific type of a new RRC message being transmitted, or based on a UE category or class, a use case, an operation mode, etc. for which the new RRC message is being transmitted, and/or the like).

In method 500, at Block 502, a RRC message can be received. In an aspect, communicating component 242, e.g., in conjunction with processor(s) 212, memory 216, transceiver 202, etc., can receive the RRC message. For example, communicating component 242 can receive the RRC message over resources (e.g., time, frequency, space, code, etc. resources) defined for receiving RRC messages. In an example, communicating component 242 can receive the RRC message in a search space defined for RRC messages, based on a CORESET defined for RRC messages, etc. Moreover, as described herein, the resources can be defined for any RRC messages in the wireless communication technology, or can be defined specifically for the new RRC messages (and/or defined based on a specific type of a new RRC message being transmitted, or based on a UE category or class, a use case, an operation mode, etc. for which the new RRC message is being transmitted, and/or the like).

In method 500, optionally at Block 504, it can be determined that the RRC message is of a new RRC message type. In an aspect, message type determining component 252, e.g., in conjunction with processor(s) 212, memory 216, transceiver 202, communicating component 242, etc., can determine that the RRC message is of the new RRC message type. For example, the new RRC message type can be different from legacy RRC message types currently defined in 5G NR. In addition, the new RRC message type can be indicated using various mechanisms described above and further herein.

In method 500, at Block 506, the RRC message can be decoded based on the new RRC message type. In an aspect, message processing component 254, e.g., in conjunction with processor(s) 212, memory 216, transceiver 202, communicating component 242, etc., can decode the RRC message based on the new RRC message type (e.g., based on determining that the RRC message is of the new RRC message type). For example, message processing component 254 can decode the RRC message as being of the new RRC message type where resources for receiving the RRC message are resources for the new RRC message type (e.g., as opposed to resources for a legacy RRC message type) or where a message type indication of the RRC message indicates that the RRC message is of the new RRC message type, etc. For example, message processing component 254 can determine a structure of the RRC message (e.g., a structure of fields and/or related values in the RRC message) based on determining the RRC message type. As described, for example, the RRC message can be of the new RRC message type for indicating RRC message data for new UE categories, use cases, operation modes, etc. Thus, message processing component 254 can decode the new RRC message to obtain information regarding the new UE categories, use cases, operation modes, etc., to determine to receiving the new RRC message and/or subsequent RRC messages according to the new UE categories, use cases, operation modes, etc., and/or the like. In an example, decoding the new RRB message can be based on determining that the RRC message is of a new RRC message type or format (e.g., as determined at Block 504).

In generating the RRC message at Block 402, optionally at Block 406, resources for transmitting the RRC message can be scheduled such to indicate the new RRC message type. In an aspect, message generating component 354, e.g., in conjunction with processor(s) 312, memory 316, transceiver 302, configuring component 342, etc., can schedule resources for transmitting the RRC message to indicate the new RRC message type. For example, message generating component 354 can select resources over which to transmit the RRC message, where the resources can be selected from resources known to indicate the new RRC message type. For example, the resources can be defined, configured, or otherwise known between the UE 104 and base station 102 to be for communicating RRC messages of the new RRC message type, or the resources may be configured or known to not be used for legacy RRC message. The resources may include one or more of time, frequency, space, code, etc. domain resources that are specific to the new RRC message type, which can include specific resources for specific new RRC message types, resources for all new RRC message types (where a more specific type may be indicated in the RRC message), etc. Thus, in an example, the resources may be different in one of time, frequency, space, and/or code from legacy resources defined for legacy RRC messages. In one example, the base station 102 can configure the resources to a UE 104 or the UE 104 may otherwise know the resources (e.g., based on implementation of UE functionality defined by the wireless communication technology).

In addition, for example, message generating component 354 can select the resources as dedicated resources related to new monitoring occasions for the new RRC message types. For example, the new monitoring occasions may be defined by a periodicity for monitoring occasions, slot/symbol level offset, for monitoring occasions, etc. In other examples, message generating component 354 can select the resources to include new bandwidth part (BWP), sub-band, etc. for the new RRC message types. Moreover, in an example, message generating component 354 can select the resources to include new beams, antenna panel or antenna port index, transmission configuration indication (TCI) state, etc. for the new RRC message types. In yet another example, message generating component 354 can select the resources to include new scrambling schemes for the new RRC message types. In the foregoing examples, message generating component 354 can select the resources to include the new features that are not defined for legacy RRC messages such to distinguish RRC messages of the new RRC message types and/or to prevent legacy UEs from trying to decode the RRC messages of the new RRC message types, etc.

In determining that the RRC message is of the new RRC message type at Block 504, optionally at Block 508, it can be determined, based on resources for receiving the RRC message, that the RRC message is of the new RRC message type. In an aspect, message type determining component 252, e.g., in conjunction with processor(s) 212, memory 216, transceiver 202, communicating component 242, etc., can determine, based on the resources for receiving the RRC message, that the RRC message is of the new RRC message type. For example, as described, the RRC message can be received over resources that are defined specifically for the new RRC message type and/or types, and these resources may not be used for legacy RRC message types. In this example, message type determining component 252 can accordingly distinguish the RRC message as being of the new RRC message type based on determining the resources over which the RRC message is received are specific (e.g., in time, frequency, space, code, etc.) to the new RRC message type. In one example, message type determining component 252 can determine the resources over which the RRC message is received based on monitoring various resources. In one example, the base station 102 can configure the resources, monitoring occasions or other indications of resources, etc. for the UE 104, and the message type determining component 252 may determine the new RRC message type based on the configured resources.

In this example, method 400 can optionally include, at Block 408, transmitting scheduling information or an indication of resources for transmitting the RRC message. In an aspect, configuring component 342, e.g., in conjunction with processor(s) 312, memory 316, transceiver 302, etc., can transmit the scheduling information or the indication of resources for transmitting the RRC message, which can relate to or otherwise implicitly indicate the new RRC message type. For example, configuring component 342 can transmit the scheduling information (e.g., in lower layer signaling, such as physical (PHY) or media access control (MAC) layer signaling) for the RRC message, where the scheduling information can indicate a mapping to a physical downlink control channel (PDCCH), which may include PDCCH resources defining the PDCCH over which the RRC message may be transmitted. In another example, configuring component 342 can transmit an indication of resources for the new RRC message type (e.g., in the PDCCH or in look-up tables or other structures transmitted in system information (SI) or other RRC signaling), which may define the monitoring occasion in the PDCCH for RRC messages of the new RRC message type. For example, the indication of resources may identify a periodicity, slot/symbol level offset, etc. of the monitoring occasion within the PDCCH. In an example, the indication of resources may additionally or alternatively identify one or more of a BWP/sub-band, beam, antenna panel or port index, TCI state, scrambling scheme, etc. used to transmit the RRC message of the new RRC message type. In either case, for example, the resources may include or may be different from those used to transmit legacy RRC messages.

In addition, in this example, method 500 can optionally include, at Block 510, receiving scheduling information or an indication of the resources for receiving the RRC message. In an aspect, message type determining component 252, e.g., in conjunction with processor(s) 212, memory 216, transceiver 202, communicating component 242, etc., can receive the scheduling information or the indication of the resources for receiving the RRC message. For example, message type determining component 252 can receive the scheduling information defining the PDCCH (e.g., in lower layer signaling) over which the RRC messages of the new RRC message type are transmitted, and/or can receive the indication of resources of the PDCCH (e.g., monitoring occasion information, BWP, sub-band, beam, antenna panel or port, TCI state, scrambling scheme, etc.) over which RRC messages of the new RRC message type are transmitted. In other examples, however, at least a portion of this information may be specified in standards of the wireless communication technology (e.g., 5G NR) and accordingly implemented in a memory 216 of the UE and/or memory 316 of the base station. In any case, message type determining component 252 can determine the RRC message received over the resources defined in the scheduling information and/or as indicated in the PDCCH is of the new RRC message type based on the time and/or frequency resources over which it is received.

In another example, in generating the RRC message at Block 402, optionally at Block 410, a message type indication can be included to indicate that the RRC message is of the new RRC message type. In an aspect, message generating component 354, e.g., in conjunction with processor(s) 312, memory 316, transceiver 302, configuring component 342, etc., can include the message type indicator to indicate that the RRC message is of the new RRC message type. For example, message generating component 354 can include the message type indication as an explicit or implicit indication of the message type as being a new RRC message type. For example, message generating component 354 can include the message type indication using a bit corresponding to an extension mechanism defined in 5G NR for extending the RRC message type. For example, 5G NR currently defines an indication bit to allow for defining extensions of certain RRC messages, such as RRC messages transmitted over a BCCH, PCCH, or CCCH, as described above. BCCH can be used for transmitting system information and can be mapped to physical channels including physical broadcast channel (PBCH), physical downlink shared channel (PDSCH), physical downlink control channel (PDCCH) (e.g., for scheduling PDSCH), etc. PCCH can be used for transmitting paging information, notifying UEs of an update for system information, transmitting a wake-up signal to the UE, etc., and can be mapped to physical channels including PDSCH, PDCCH (e.g., for scheduling PDSCH), etc. CCCH can be used for transmitting control information related to a random access procedure and can be mapped to physical channels including PDCCH, PDSCH, etc.

For example, 5G NR can define various RRC message classes, such as a BCCH-BCH-MessageType, PCCH-MessageType, DL-CCCH-MessageType, or BCCH-DL-SCH-MessageType that includes a messageClassExtension field that can be a parameter (e.g., a bit or other parameter) which, when set to a non-zero value, can indicate existence of a message extension for the RRC message type. In addition, in an example, at least the PCCH-MessageType and DL-CCCH-MessageType can have spare or reserved bits defined in the message type. Accordingly, in a specific example, message generating component 354 can use at least one of the messageClassExtension field or one or more of the spare or reserved bits for certain RRC messages to indicate the new RRC message type. For example, message generating component 354 can use one of the foregoing message classes (e.g., BCCH-BCH-MessageType, PCCH-MessageType, DL-CCCH-MessageType, or BCCH-DL-SCH-MessageType) for the new RRC message type (e.g., as a legacy RRC message class or as a new message class derived from the legacy RRC message class or otherwise including similar parameters as the legacy RRC message class) and can reset the MessageType indicator (e.g., the messageClassExtension field) to a value in the related RRC message class to indicate the new RRC message type. For example, this value may not be comprehended by legacy devices or devices supporting only legacy operations or use cases (e.g., a non-zero value or other value not defined for the legacy devices, operations, or use cases), and may thus be ignored to prevent the legacy device from attempting to decode the new RRC message type.

In another example, message generating component 354 can use one or more spare or reserved bits of a message class to indicate the new RRC message type. In a specific example, message generating component 354 can use one or more of the spare bits of a PCCH-MessageType or DL-CCCH-MessageType message class to indicate the new RRC message type. In an example, one bit can be used to indicate a new RRC message type (e.g., as opposed to a legacy RRC message type) and/or additional bits can be used to indicate different types that are each new RRC message types, etc. For example, using the spare or reserved bits for the RRC message can include the message generating component 354 setting the spare or reserved bits to extended values (e.g., values other than zero or values otherwise not used in legacy RRC messages) that may not be comprehended by legacy UEs and/or may be comprehended only by desired devices or device groups associated with new UE categories, new use cases, or new operation modes.

In another example, message generating component 354 can use padding bits of a RRC message to indicate the new RRC message type. For example, if an encoded RRC message (e.g., following ASN.1 encoding) does not fill a transport block, an RRC layer of the base station 102 can typically add padding bits to fill the transport block, where the padding bits are each set to zero, and the number of padding bits is a multiple of eight. In an example, this can apply to BCCH and PCCH RRC messages. In this example, message generating component 354 can instead set one or more of the padding bits to values to indicate a new RRC message type. For example, setting the padding bits for the RRC message to extended values may not be comprehended by legacy UEs, and thus legacy UEs may not process the RRC message, but UEs that support the message can determine the new RRC message type based on the value of the one or more padding bits. For example, the value of the one or more padding bits can be set to non-zero values.

In the above example(s), in determining that the RRC message is of the new RRC message type at Block 504, optionally at Block 512, it can be determined, based on a message type indication, that the RRC message is of the new RRC message type. In an aspect, message type determining component 252, e.g., in conjunction with processor(s) 212, memory 216, transceiver 202, communicating component 242, etc., can determine, based on the message type indication, that the RRC message is of the new RRC message type. In an example, the message type indication can be useable for both legacy RRC message type and new RRC message type. For example, as described, the RRC message can include a configurable parameter, such as the message type indication in a parameter of a RRC message class, where the RRC message class may be, or may be derived from, a legacy RRC message class, as described. In this example, message type determining component 252 can determine the message type based on a value of the message type indicator in the RRC message class. In another example, the RRC message can include the message type indication in one or more spare or reserved bits defined in the RRC message class, where the RRC message class may be, or may be derived from, a legacy RRC message class, as described. In this example, message type determining component 252 can determine the message type based on a value of the one or more spare or reserved bits. In another example, the RRC message can include the message type indication in one or more padding bits included in the RRC message, as described. In this example, message type determining component 252 can determine the message type based on a value of the one or more padding bits.

In another example, in generating the RRC message at Block 402, optionally at Block 412, the RRC message can be generated based on a CRC scheme that implies the new RRC message type. In an aspect, message generating component 354, e.g., in conjunction with processor(s) 312, memory 316, transceiver 302, configuring component 342, etc., can generate the RRC message based on a CRC scheme that implies the new RRC message type. For example, message generating component 354 can apply a CRC to the payload bits of the RRC message based on the CRC scheme. In an example, message generating component 354 can determine to modify one or more parameters of the CRC scheme with values known or configured to indicate the new RRC message type. For example, message generating component 354 can modify a length of parity bits, an interleaving scheme of CRC bits, etc. of the CRC scheme to values that are used only for new RRC message types, such to indicate the new RRC message type.

In this example, in determining that the RRC message is of the new RRC message type at Block 504, optionally at Block 514, it can be determined, based on CRC of the RRC message, that the RRC message is of the new RRC message type. In an aspect, message type determining component 252, e.g., in conjunction with processor(s) 212, memory 216, transceiver 202, communicating component 242, etc., can determine, based on the CRC of the RRC message, that the RRC message is of the new RRC message type. For example, message type determining component 252 can determine a CRC of the RRC message based on performing a CRC scheme detection to determine one or more parameters related to the CRC of the RRC message. In this example, message type determining component 252 can perform the CRC scheme detection based on various parameter values in an attempt to determine whether certain parameter values are indicative of the new RRC message type (e.g., a length of parity bits, an interleaving scheme of CRC bits, etc.), and if so, can determine the RRC message is of the new RRC message type.

In another example, in generating the RRC message at Block 402, optionally at Block 414, a CORESET or SS set for the RRC message that implies the new RRC message type can be generated. In an aspect, message generating component 354, e.g., in conjunction with processor(s) 312, memory 316, transceiver 302, configuring component 342, etc., can generate the CORESET or the SS set for the RRC message that implies the new RRC message type. For example, message generating component 354 can configure the PDCCH that schedules the new RRC messages based on one or more CORESET parameters or SS set parameters that are defined for new RRC message types. For example, the CORESET or SS set parameter may include or otherwise indicate a set of time, frequency, space, code, etc. resources for the PDCCH that schedules the new RRC messages. In an example, the CORESET or SS set parameters may include the parameters as different from, or otherwise not defined for, legacy RRC message types. For example, the CORESET and/or SS set parameters (or configuration) can be configured to the UE 104 (e.g., by the base station 102) or otherwise known by the base station 102 and UE 104 (e.g., based on implementation thereof according to a wireless communication technology, as described).

In this example, in determining that the RRC message is of the new RRC message type at Block 504, optionally at Block 516, it can be determined, based on a CORESET or SS set for the RRC message, that the RRC message is of the new RRC message type. In an aspect, message type determining component 252, e.g., in conjunction with processor(s) 212, memory 216, transceiver 202, communicating component 242, etc., can determine, based on the CORESET or SS set for the RRC message, that the RRC message is of the new RRC message type. For example, message type determining component 252 can monitor for RRC messages based on the CORESET or SS set configuration for the new RRC message types and/or can monitor for legacy RRC messages based on the CORESET or SS set defined for legacy RRC messages. In this example, based on the CORESET or SS set based on which the RRC message is detected, message type determining component 252 can determine whether the RRC message is of the new RRC message type, whether the RRC message is of the legacy RRC message type, etc.

In another example, in generating the RRC message at Block 402, optionally at Block 416, a RNTI, that implies the new RRC message type, can be applied to the RRC message or a control channel that schedules the RRC message. In an aspect, message generating component 354, e.g., in conjunction with processor(s) 312, memory 316, transceiver 302, configuring component 342, etc., can apply the RNTI, that implies the new RRC message type, to the RRC message or the control channel that schedules the RRC message. For example, message generating component 354 can configure RNTI values unique to the new RRC message type(s), which message generating component 354 can apply to the new RRC message (e.g., to scramble the new RRC message) and/or can use to mask the CRC of PDCCH. For example, the RNTIs can be configured to the UE 104 (e.g., by the base station 102) or otherwise known by the base station 102 and UE 104 (e.g., based on implementation thereof according to a wireless communication technology, as described).

In this example, in determining that the RRC message is of the new RRC message type at Block 504, optionally at Block 518, it can be determined, based on a RNTI applied to the RRC message or its control channel, that the RRC message is of the new RRC message type. In an aspect, message type determining component 252, e.g., in conjunction with processor(s) 212, memory 216, transceiver 202, communicating component 242, etc., can determine, based on a RNTI applied to (e.g., used to scramble) the RRC message or its control channel, that the RRC message is of the new RRC message type. For example, message type determining component 252 can attempt to decode or descramble signals received in the search space based on the RNTI to determine whether the signal indicates a new RRC message type.

Where the new RRC messages can be distinguished based on explicit or implicit message type indication, as described in examples above, the new RRC message type can reuse resources allocated for legacy RRC messages. In this or other examples, the new RRC message types can have same or different payload size as legacy RRC messages, same or different number of fields as legacy RRC messages, same or different field size for the "common" field as legacy RRC messages, same or different mapping orders for MAC sub-protocol data unit (PDU) as legacy RRC messages, same or different contents for MAC sub-headers as legacy RRC messages, etc. Message generating component 354 can accordingly generate the RRC messages of the new RRC message types based on such parameters. In any case, message processing component 254 can decode the received RRC message based on the determined new RRC message type (e.g., based on same or different number of fields as legacy RRC messages, same or different field size for the "common" field as legacy RRC messages, same or different mapping orders for MAC sub-protocol data unit (PDU) as legacy RRC messages, same or different contents for MAC sub-headers as legacy RRC messages, etc.) as indicated or configured for the new RRC message types.

In addition, in an example, in method 500, optionally at Block 520, it can be determined, based on the new RRC message type, that decoding of the RRC message is supported. In an aspect, message type determining component 252, e.g., in conjunction with processor(s) 212, memory 216, transceiver 202, communicating component 242, etc., can determine, based on the new RRC message type, that decoding of the RRC message is supported. For example, message type determining component 252 can determine such based on the ability to determine the new RRC message type and/or to otherwise properly determine the associated parameters (e.g., the message type indication, etc.). In any case, for example, message processing component 254 can determine to decode the RRC message based on message type determining component 252 determining that the new RRC message type is supported.

Though examples described above describe using mechanisms to distinguish new RRC message types from legacy RRC message types, the mechanisms may additionally or alternatively be used to distinguish certain new RRC message types from other RRC message types. For example, one set of resources, indicators, spare or reserved bits or bit values, padding bits or bit values, CRCs, CORESET or SS set configurations, RNTIs, etc., can be used for a first new RRC message type (e.g., for a first UE category, use case, operation mode, etc.) while a second set of resources, indicators, spare or reserved bits or bit values, padding bits or bit values, CRCs, CORESET or SS set configurations, RNTIs, etc., can be used for a second new RRC message type (e.g., for a second UE category, use case, operation mode, etc.).

FIG. 6 illustrates a flow chart of an example of a method 600 for attempting to process new RRC message types. In an example, a UE 104 can perform the functions described in method 600 using one or more of the components described in FIGS. 1-2.

In method 600, at Block 602, the UE can process the scheduling information for the desirable RRC message type or can search configured resources for the desirable RRC message type. In an aspect, message type determining component 252, e.g., in conjunction with processor(s) 212, memory 216, transceiver 202, communicating component 242, etc., can cause the UE to process the scheduling information for the desirable RRC message type or search the configured resources for the desirable RRC message type. For example, message type determining component 252 can be configured with, or otherwise can know (e.g., based on implementation according to a wireless communication technology) or can determine, scheduling information for RRC messages of the new RRC message type and/or for a corresponding control channel to be searched, as described above. In this example, message type determining component 252 can accordingly monitor resources and/or otherwise receive RRC messages of the desirable RRC message type (e.g., a new RRC message type) over the resources. Message processing component 254, in an example, may attempt to decode the RRC message as received.

In method 600, at Block 604, the UE can determine whether decoding or detection is successful. In an aspect, message processing component 254, e.g., in conjunction with processor(s) 212, memory 216, transceiver 202, communicating component 242, etc., can cause the UE to determine whether the decoding or detection of the new RRC message or message type is successful. For example, message processing component 254 can determine successful decoding or detection based on one or more of whether CRC is successful, whether valid data is obtained in the RRC message once decoded, whether the RRC message has expected parameter values (e.g., for message type indicator in an indication bit, padding bits, space/reserved bits, etc.), whether the RRC message has expected implicit indicators of the new RRC message type (e.g., expected CRC parameters, RNTI, etc.), and/or the like.

If the UE determines the decoding or detection is successful at Block 604, at Block 606, the UE can process the new RRC message type. In an aspect, message processing component 254, e.g., in conjunction with processor(s) 212, memory 216, transceiver 202, communicating component 242, etc., can cause the UE to process the new RRC message type. For example, message processing component 254 can process the RRC message according to the new RRC message type (e.g., based on locations of values in the new RRC message according to the new RRC message type). Thus, in this example, message processing component 254 can attempt to obtain certain data from the RRC message based on the new RRC message type.

For example, at Block 608, the UE can determine whether it comprehends the indicator for the new RRC message type. In an aspect, message type determining component 252, e.g., in conjunction with processor(s) 212, memory 216, transceiver 202, communicating component 242, etc., can cause the UE to determine whether it comprehends the indicator for the new RRC message type. For example, the indicator can be an implicit or explicit indicator, as described in various examples above. Thus, in one example, message type determining component 252 can determine whether the RRC message includes the indicator of the new RRC message type.

If the UE comprehends the indicator for the new RRC message type at Block 608, at Block 610, the UE can follow the signaling information in the new RRC message type. In an aspect, message processing component 254, e.g., in conjunction with processor(s) 212, memory 216, transceiver 202, communicating component 242, etc., can cause the UE to follow the signaling information in the new RRC message type such to determine information from the received RRC message based on the new RRC message type (e.g., based on a format of parameters determined for the new RRC message type).

If the UE does not comprehend the indicator for the new RRC message type at Block 608, at Block 612, the UE can follow generic error handling procedures for RRC messages. In an aspect, message processing component 254, e.g., in conjunction with processor(s) 212, memory 216, transceiver 202, communicating component 242, etc., can cause the UE to follow generic error handling procedures for RRC messages. For example, this can include message processing component 254 considering the value as not comprehended, in which case message processing component 254 can determine to drop the message, indicate an error to upper layers and/or to the base station 102, and/or the like. Similarly, if decoding or detection is not successful at Block 604, at Block 612, the UE can follow generic error handling procedures for RRC messages.

Figure 7:
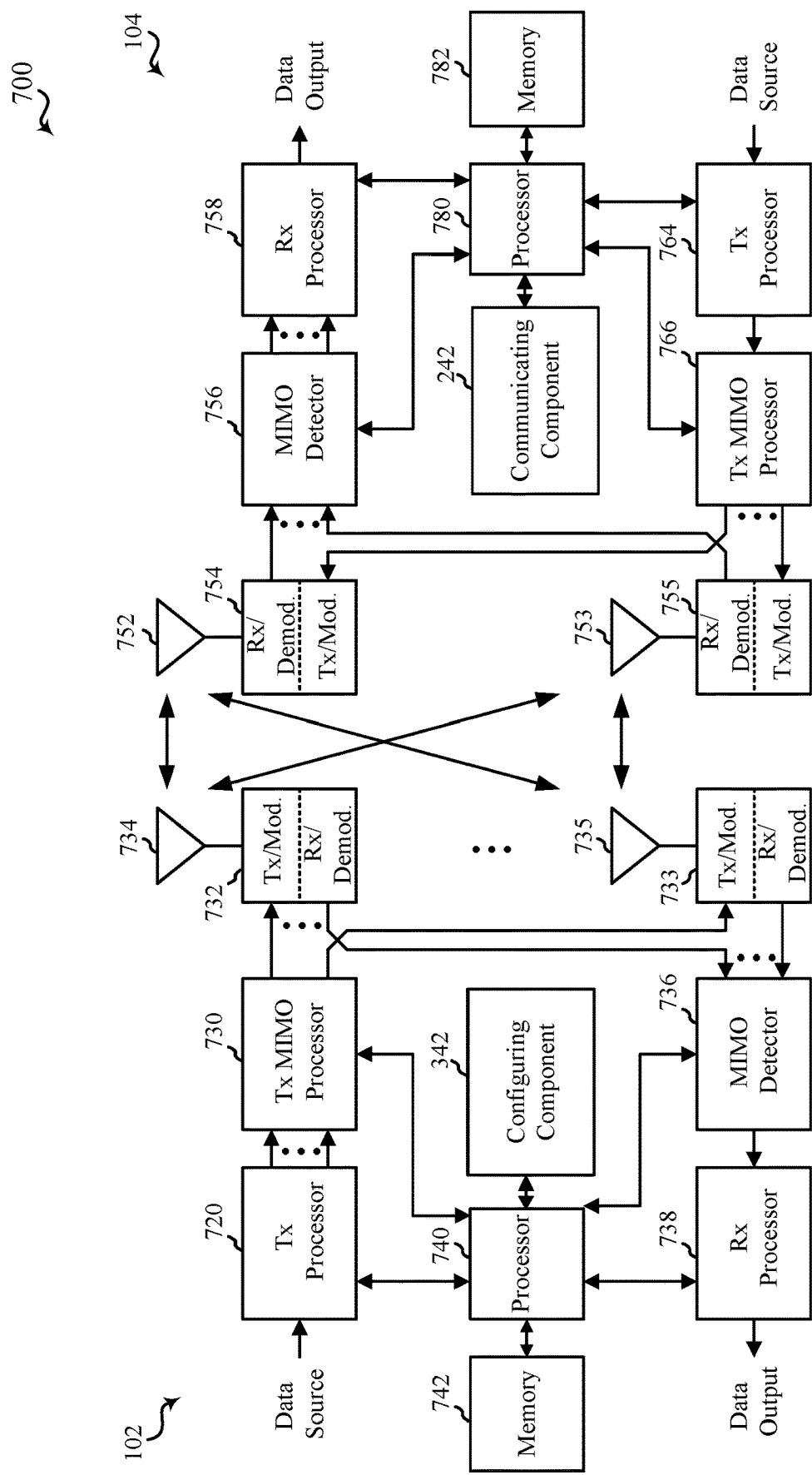
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including receiving, from a base station, a RRC message, determining, based on at least one of resources for receiving the RRC message or a message type indication of the RRC message, that the RRC message is of a new RRC message type that is different from legacy RRC message types, and decoding the RRC message based on determining that the RRC message is of the new RRC message type.

In Aspect 2, the method of Aspect 1 includes wherein decoding the RRC message is further based on determining, based on the new RRC message type, that decoding of the new RRC message type is supported.

In Aspect 3, the method of any of Aspects 1 or 2 includes wherein the resources for the RRC message of the new RRC message type are different from resources for receiving legacy RRC messages at least in time, frequency, space, code domain, or a combination of thereof.

In Aspect 4, the method of any of Aspects 1 to 3 includes receiving a scheduling information or an indication of the resources for receiving the RRC message, wherein determining that the RRC message is of the new RRC message type is based on the scheduling information or the indication of the resources.

In Aspect 5, the method of Aspect 4 includes wherein the scheduling information or the indication of the resources indicates at least one of one or more monitoring occasions to receive the RRC message, a BWP for receiving the RRC message, a beam for receiving the RRC message, an antenna panel or port index for receiving the RRC message, a TCI state for receiving the RRC message, or a scrambling scheme used to transmit the RRC message.

In Aspect 6, the method of any of Aspects 1 to 5 includes wherein the resources for the RRC message of the new RRC message type are shared with resources for receiving legacy RRC messages, and wherein the new RRC message type is associated with at least one of a different payload size, different number of fields, different field size for a common field, different mapping order for a MAC sub-PDU, or different contents for one or more MAC sub-headers, than for legacy RRC message types.

In Aspect 7, the method of any of Aspects 1 to 6 includes wherein the RRC message includes at least a configurable parameter that specifies the message type indication, and wherein the message type indication is useable for both legacy RRC message type and new RRC message type.

In Aspect 8, the method of Aspect 7 includes wherein the message type indication is specified as an extended value and wherein determining that the RRC message is of the new RRC message type includes decoding the RRC message and determining the extended value.

In Aspect 9, the method of any of Aspects 1 to 8 includes wherein the new RRC message type includes a number of padding bits, wherein the message type indication is specified by configuring different values for at least a portion of the number of padding bits, and wherein determining that the RRC message is of the new RRC message type includes decoding the RRC message and detecting the different values for at least the portion of the number of padding bits.

In Aspect 10, the method of any of Aspects 1 to 9 includes wherein the new RRC message type includes one or more spare or reserved bits, wherein the message type indication is specified by configuring different values for at least one of the one or more spare or reserved bits, and wherein determining that the RRC message is of the new RRC message type includes decoding the RRC message and detecting the different values for at least one of the one or more spare or reserved bits.

In Aspect 11, the method of any of Aspects 1 to 10 includes wherein the message type indication is implied by a CRC scheme of the RRC message, and wherein determining that the RRC message is of the new RRC message type includes performing a CRC scheme detection of the RRC message.

In Aspect 12, the method of any of Aspects 1 to 11 includes wherein the message type indication is implied by a control resource set or search space set configuration for a control channel scheduling the RRC message, and wherein determining that the RRC message is of the new RRC message type includes determining the control resource set or search space set configuration for the control channel.

In Aspect 13, the method of any of Aspects 1 to 12 includes wherein the message type indication is implied by a RNTI used for scrambling the RRC message or masking a control channel that schedules the RRC message, and wherein determining that the RRC message is of the new RRC message type includes determining the RNTI.

Aspect 14 is a method for wireless communication including generating a RRC message that is of a new RRC message type that is different from legacy RRC message types, wherein generating the RRC message includes at least one of scheduling resources for transmitting the RRC message to indicate that the RRC message is of the new RRC message type or including a message type indication of the RRC message to indicate that the RRC message is of the new RRC message type, and transmitting, to one or more UEs, the RRC message.

In Aspect 15, the method of Aspect 14 includes wherein the resources are different from resources for receiving legacy RRC messages.

In Aspect 16, the method of Aspect 15 includes transmitting a scheduling information or an indication of the resources for transmitting the RRC message.

In Aspect 17, the method of any of Aspects 14 to 16 includes wherein the resources correspond to at least one of one or more monitoring occasions over which the RRC message is transmitted, a BWP for transmitting the RRC message, a beam for transmitting the RRC message, an antenna panel or port index for transmitting the RRC message, a TCI state for transmitting the RRC message, or a scrambling scheme used to transmit the RRC message.

In Aspect 18, the method of any of Aspects 14 to 17 includes wherein the resources are shared with resources for transmitting legacy RRC messages, and wherein the new RRC message type is associated with at least one of a different payload size, different number of fields, different field size for a common field, different mapping order for a MAC sub-PDU, or different contents for one or more MAC sub-headers, than for legacy RRC message types.

In Aspect 19, the method of any of Aspects 14 to 18 includes wherein generating the RRC message includes generating the RRC message to include a parameter that specifies the message type indication, and wherein the message type indication is useable for both legacy RRC message type and new RRC message type.

In Aspect 20, the method of Aspect 19 includes wherein generating the RRC message includes generating the RRC message to include the message type indication specified as an extended value.

In Aspect 21, the method of any of Aspects 14 to 20 includes wherein the RRC message includes a number of padding bits, and wherein generating the RRC message includes generating the RRC message to include the message type indication specified by configuring different values for at least a portion of the number of padding bits.

In Aspect 22, the method of any of Aspects 14 to 21 includes wherein the RRC message includes one or more spare or reserved bits, and wherein generating the RRC message includes generating the RRC message to include the message type indication specified by configuring different values for at least one of the one or more spare or reserved bits.

In Aspect 23, the method of any of Aspects 14 to 22 includes wherein generating the RRC message includes generating the RRC message based on a CRC scheme that implies a value of the message type indication.

In Aspect 24, the method of any of Aspects 14 to 23 includes wherein generating the RRC message includes generating the RRC message based on a control resource set or search space set configuration for a control channel scheduling the RRC message, and wherein the control resource set or synchronization signal set configuration implies the message type indication.

In Aspect 25, the method of any of Aspects 14 to 24 includes wherein generating the RRC message includes scrambling the RRC message or masking a control channel that schedules the RRC message based on a RNTI, wherein the RNTI implies the message type indication.

Aspect 26 is a method for wireless communication including receiving, from a base station, a RRC message, and where resources for receiving the RRC message are resources for a new RRC message type that is different from legacy RRC message types or where a message type indication of the RRC message indicates that the RRC message is of the new RRC message type, decoding the RRC message based on the new RRC message type.

In Aspect 27, the method of Aspect 26 includes wherein decoding the RRC message is further based on determining, based on the new RRC message type, that decoding of the new RRC message type is supported.

In Aspect 28, the method of any of Aspects 26 or 27 includes wherein the resources for the RRC message of the new RRC message type are different from resources for receiving legacy RRC messages at least in time, frequency, space, code domain, or a combination of thereof.

In Aspect 29, the method of any of Aspects 26 to 28 includes receiving a scheduling information or an indication of the resources for receiving the RRC message, wherein the scheduling information or the indication of the resources correspond to the new RRC message type.

In Aspect 30, the method of Aspect 29 includes wherein the scheduling information or the indication of the resources indicates at least one of one or more monitoring occasions to receive the RRC message, a BWP for receiving the RRC message, a beam for receiving the RRC message, an antenna panel or port index for receiving the RRC message, a TCI state for receiving the RRC message, or a scrambling scheme used to transmit the RRC message.

In Aspect 31, the method of any of Aspects 26 to 30 includes wherein the resources for the RRC message of the new RRC message type are shared with resources for receiving legacy RRC messages, and wherein the new RRC message type is associated with at least one of a different payload size, different number of fields, different field size for a common field, different mapping order for a MAC sub-PDU, or different contents for one or more MAC sub-headers, than for legacy RRC message types.

In Aspect 32, the method of any of Aspects 26 to 31 includes wherein the RRC message includes at least a configurable parameter that specifies the message type indication, and wherein the message type indication is useable for both legacy RRC message type and new RRC message type.

In Aspect 33, the method of Aspect 32 includes wherein the message type indication is specified as an extended value and wherein decoding the RRC message based on the new RRC message type includes decoding at least a portion of the RRC message based on the legacy RRC message type and determining the extended value.

In Aspect 34, the method of any of Aspects 26 to 33 includes wherein the new RRC message type includes a number of padding bits, wherein the message type indication is specified by configuring non-zero values for at least a portion of the number of padding bits, and wherein decoding the RRC message based on the new RRC message type includes decoding the RRC message based on the legacy RRC message type and detecting the non-zero values for at least the portion of the number of padding bits.

In Aspect 35, the method of any of Aspects 26 to 34 includes wherein the new RRC message type includes one or more spare or reserved bits, wherein the message type indication is specified by configuring non-zero values for at least one of the one or more spare or reserved bits, and wherein decoding the RRC message based on the new RRC message type includes decoding the RRC message based on the legacy RRC message type and detecting the non-zero values for at least one of the one or more spare or reserved bits.

In Aspect 36, the method of any of Aspects 26 to 35 includes wherein the message type indication is implied by a cyclic redundancy check (CRC) scheme of the RRC message, and wherein decoding the RRC message based on the new RRC message type includes performing a CRC scheme detection of the RRC message.

In Aspect 37, the method of any of Aspects 26 to 36 includes wherein the message type indication is implied by a control resource set or search space set configuration for a control channel scheduling the RRC message, and wherein decoding the RRC message based on the new RRC message type includes determining the control resource set or search space set configuration for the control channel.

In Aspect 38, the method of any of Aspects 26 to 37 includes wherein the message type indication is implied by a RNTI used for scrambling the RRC message or masking a control channel that schedules the RRC message, and wherein decoding the RRC message based on the new RRC message type includes determining the RNTI.

Aspect 39 is an apparatus for wireless communication including a transceiver, a memory configured to store instructions, and one or more processors communicatively coupled with the memory and the transceiver, wherein the one or more processors are configured to perform one or more of the methods of any of Aspects 1 to 38.

Aspect 40 is an apparatus for wireless communication including means for performing one or more of the methods of any of Aspects 1 to 38.

Aspect 41 is a computer-readable medium including code executable by one or more processors for wireless communications, the code including code for performing one or more of the methods of any of Aspects 1 to 38.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
   receive, from a base station, a radio resource control (RRC) message; and
   where resources for receiving the RRC message are resources for a new RRC message type that is different from legacy RRC message types or where a message type indication of the RRC message indicates that the RRC message is of the new RRC message type, decode the RRC message based on the new RRC message type,
   wherein the resources for the RRC message of the new RRC message type are different from resources for receiving legacy RRC messages at least in time, frequency, space, code domain, or a combination of thereof.

2. The apparatus of claim 1, wherein the one or more processors are configured to decode the RRC message further based on determining, based on the new RRC message type, that decoding of the new RRC message type is supported.

3. The apparatus of claim 1, wherein the one or more processors are further configured to receive a scheduling information or an indication of the resources for receiving the RRC message, wherein the scheduling information or the indication of the resources correspond to the new RRC message type.

4. The apparatus of claim 3, wherein the scheduling information or the indication of the resources indicates at least one of one or more monitoring occasions to receive the RRC message, a bandwidth part (BWP) for receiving the RRC message, a beam for receiving the RRC message, an antenna panel or port index for receiving the RRC message, a transmission configuration indicator (TCI) state for receiving the RRC message, or a scrambling scheme used to transmit the RRC message.

5. The apparatus of claim 1, wherein the resources for the RRC message of the new RRC message type are shared with resources for receiving legacy RRC messages, and wherein the new RRC message type is associated with at least one of a different payload size, different number of fields, different field size for a common field, different mapping order for a media access control (MAC) sub-protocol data unit (PDU), or different contents for one or more MAC sub-headers, than for legacy RRC message types.

6. The apparatus of claim 1, wherein the RRC message includes at least a configurable parameter that specifies the message type indication, and wherein the message type indication is useable for both legacy RRC message type and new RRC message type.

7. The apparatus of claim 6, wherein the message type indication is specified as an extended value and wherein the one or more processors are configured to decode the RRC message based on the new RRC message type and determining the extended value.

8. The apparatus of claim 1, wherein the new RRC message type includes a number of padding bits, wherein the message type indication is specified by configuring non-zero values for at least a portion of the number of padding bits, and wherein the one or more processors are configured to decode the RRC message based on the new RRC message type and detecting the non-zero values for at least the portion of the number of padding bits.

9. The apparatus of claim 1, wherein the new RRC message type includes one or more spare or reserved bits, wherein the message type indication is specified by configuring non-zero values for at least one of the one or more spare or reserved bits, and wherein the one or more processors are configured to decode the RRC message based on the new RRC message type and detecting the non-zero values for at least one of the one or more spare or reserved bits.

10. The apparatus of claim 1, wherein the message type indication is implied by a cyclic redundancy check (CRC) scheme of the RRC message, and wherein the one or more processors are configured to decode the RRC message based on the new RRC message type and performing a CRC scheme detection of the RRC message.

11. The apparatus of claim 1, wherein the message type indication is implied by a control resource set or search space set configuration for a control channel scheduling the RRC message, and wherein the one or more processors are configured to decode the RRC message based on the new RRC message type and determining the control resource set or search space set configuration for the control channel.

12. The apparatus of claim 1, wherein the message type indication is implied by a radio network temporary identifier (RNTI) used for scrambling the RRC message or masking a control channel that schedules the RRC message, and the one or more processors are configured to decode the RRC message based on the new RRC message type and determining the RNTI.

13. An apparatus for wireless communication, comprising:
a transceiver;
a memory configured to store instructions; and
one or more processors communicatively coupled with the memory and the transceiver, wherein the one or more processors are configured to:
generate a radio resource control (RRC) message that is of a new RRC message type that is different from legacy RRC message types, wherein the one or more processors are configured to generate the RRC message at least in part by at least one of scheduling resources for transmitting the RRC message to indicate that the RRC message is of the new RRC message type or including a message type indication of the RRC message to indicate that the RRC message is of the new RRC message type; and
transmit, to one or more user equipment (UEs), the RRC message,
wherein the resources are different from resources for receiving legacy RRC messages.

14. The apparatus of claim 3 wherein the one or more processors are further configured to transmit a scheduling information or an indication of the resources for transmitting the RRC message.

15. The apparatus of claim 13, wherein the resources correspond to at least one of one or more monitoring occasions over which the RRC message is transmitted, a bandwidth part (BWP) for transmitting the RRC message, a beam for transmitting the RRC message, an antenna panel or port index for transmitting the RRC message, a transmission configuration indicator (TCI) state for transmitting the RRC message, or a scrambling scheme used to transmit the RRC message.

16. The apparatus of claim 13, wherein the resources are shared with resources for transmitting legacy RRC messages, and wherein the new RRC message type is associated with at least one of a different payload size, different number of fields, different field size for a common field, different mapping order for a media access control (MAC) sub-protocol data unit (PDU), or different contents for one or more MAC sub-headers, than for legacy RRC message types.

17. The apparatus of claim 13, wherein the one or more processors are configured to generate the RRC message to include a parameter that specifies the message type indication, and wherein the message type indication is useable for both legacy RRC message type and new RRC message type.

18. The apparatus of claim 17, wherein the one or more processors are configured to generate the RRC message to include the message type indication specified as an extended value.

19. The apparatus of claim 13, wherein the RRC message includes a number of padding bits, and wherein the one or more processors are configured to generate the RRC message to include the message type indication specified by configuring non-zero values for at least a portion of the number of padding bits.

20. The apparatus of claim 13, wherein the RRC message includes one or more spare or reserved bits, and wherein the one or more processors are configured to generate the RRC message to include the message type indication specified by configuring non-zero values for at least one of the one or more spare or reserved bits.

21. The apparatus of claim 13, wherein the one or more processors are configured to generate the RRC message based on a cyclic redundancy check (CRC) scheme that implies a value of the message type indication.

22. The apparatus of claim 13, wherein the one or more processors are configured to generate the RRC message based on a control resource set or search space set configuration for a control channel scheduling the RRC message, and wherein the control resource set or synchronization signal set configuration implies the message type indication.

23. The apparatus of claim 13, wherein the one or more processors are configured to generate the RRC message at least in part by scrambling the RRC message or masking a control channel that schedules the RRC message based on a radio network temporary identifier (RNTI), wherein the RNTI implies the message type indication.

24. A method for wireless communication by a user equipment (UE), comprising:
receiving, from a base station, a radio resource control (RRC) message; and
where resources for receiving the RRC message are resources for a new RRC message type that is different from legacy RRC message types or where a message type indication of the RRC message indicates that the RRC message is of the new RRC message type, decoding the RRC message based on the new RRC message type,
wherein the resources for the RRC message of the new RRC message type are different from resources for receiving legacy RRC messages at least in time, frequency, space, code domain, or a combination thereof.

25. The method of claim 24, wherein decoding the RRC message is further based on determining, based on the new RRC message type, that decoding of the new RRC message type is supported.

26. The method of claim 24, further comprising receiving a scheduling information or an indication of the resources for receiving the RRC message, wherein the scheduling information or the indication of the resources correspond to the new RRC message type.

27. The method of claim 24, wherein the resources for the RRC message of the new RRC message type are shared with resources for receiving legacy RRC messages, and wherein the new RRC message type is associated with at least one of a different payload size, different number of fields, different field size for a common field, different mapping order for a media access control (MAC) sub-protocol data unit (PDU), or different contents for one or more MAC sub-headers, than for legacy RRC message types.

28. The method of claim 24, wherein the RRC message includes at least a configurable parameter that specifies the message type indication, and wherein the message type indication is useable for both legacy RRC message type and new RRC message type.

29. A method for wireless communication by a base station, comprising:
generating a radio resource control (RRC) message that is of a new RRC message type that is different from legacy RRC message types, wherein generating the RRC message includes at least one of scheduling resources for transmitting the RRC message to indicate that the RRC message is of the new RRC message type or including a message type indication of the RRC message to indicate that the RRC message is of the new RRC message type; and
transmitting, to one or more user equipment (UEs), the RRC message,
wherein the resources are different from resources for receiving legacy RRC messages.

30. The method of claim 29, further comprising transmitting a scheduling information or an indication of the resources for transmitting the RRC message.

* * * * *